US009479947B2

(12) United States Patent
Chang et al.

(10) Patent No.: US 9,479,947 B2
(45) Date of Patent: Oct. 25, 2016

(54) NETWORK DATA OPTIMIZATION

(71) Applicants: Verizon Patent and Licensing Inc., Basking Ridge, NJ (US); Cellco Partnership, Basking Ridge, NJ (US)

(72) Inventors: Patricia Ruey-Jane Chang, San Ramon, CA (US); Lalit R. Kotecha, San Ramon, CA (US); Donna L. Polehn, Kirkland, WA (US); Mingxing S. Li, San Jose, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 246 days.

(21) Appl. No.: 14/182,753

(22) Filed: Feb. 18, 2014

(65) Prior Publication Data

US 2015/0237512 A1    Aug. 20, 2015

(51) Int. Cl.
*H04W 80/04*    (2009.01)
*H04W 24/02*    (2009.01)
*H04W 48/14*    (2009.01)

(52) U.S. Cl.
CPC .............. *H04W 24/02* (2013.01); *H04W 48/14* (2013.01)

(58) Field of Classification Search
CPC ... H04W 80/04; H04W 84/12; H04W 88/06; H04W 88/08; H04W 84/18
See application file for complete search history.

(56) References Cited

U.S. PATENT DOCUMENTS

| 6,236,855 | B1 * | 5/2001 | Austin | H04L 1/0079 455/423 |
|---|---|---|---|---|
| 7,177,653 | B2 * | 2/2007 | McAvoy | H04W 64/00 455/436 |
| 8,724,509 | B2 * | 5/2014 | Cheng | H04W 76/022 370/254 |
| 8,831,655 | B2 * | 9/2014 | Burchill | H04W 52/243 370/310 |
| 2005/0064879 | A1 * | 3/2005 | McAvoy | H04W 64/00 455/456.1 |
| 2009/0011779 | A1 * | 1/2009 | MacNaughtan | G01S 5/0252 455/456.6 |
| 2011/0059744 | A1 * | 3/2011 | Won | H04W 8/26 455/450 |
| 2012/0057456 | A1 * | 3/2012 | Bogatin | H04W 28/08 370/230.1 |

(Continued)

OTHER PUBLICATIONS

Wikipedia, "Application Delivery Network", http://en.wikipedia.org/wiki/Application_delivery_network, Feb. 7, 2014, 8 pages.

(Continued)

*Primary Examiner* — Hassan Phillips
*Assistant Examiner* — Prenell Jones

(57) ABSTRACT

A device is configured to obtain base station information for base stations indicating whether data communicated via a respective base station should receive optimization processing. The device may obtain a base station identifier from a base station. The device may determine whether the data communicated via the base station should receive the optimization processing based on the base station information and the base station identifier. The device may receive non-optimized data to be sent to a client device via the base station. The device may selectively cause the optimization processing to be performed on the non-optimized data based on whether the data communicated via the base station should receive the optimization processing. The device may provide optimized data generated by the optimization processing or the non-optimized data to the client device via the base station based on selectively causing the optimization processing to be performed.

20 Claims, 7 Drawing Sheets

(56) References Cited

U.S. PATENT DOCUMENTS

| | | | | |
|---|---|---|---|---|
| 2013/0163424 A1* | 6/2013 | Goerke | H04W 24/02 | 370/235 |
| 2013/0203450 A1* | 8/2013 | Mochizuki | H04W 68/02 | 455/458 |
| 2014/0254380 A1* | 9/2014 | Swenson | H04L 47/11 | 370/235 |
| 2014/0313985 A1* | 10/2014 | Nimbalker | H04L 27/0012 | 370/329 |
| 2014/0348083 A1* | 11/2014 | Mishra | H04L 12/66 | 370/329 |

OTHER PUBLICATIONS

Google Developers, "PageSpeed Module", https://developers.google.com/speed/pagespeed/module, Oct. 31, 2013, 1 page.

Wikipedia, "TCP Tuning", http://en.wikipedia.org/wiki/TCP_tuning, Aug. 20, 2013, 4 pages.

Wikipedia, "TCP window scale option", http://en.wikipedia.org/wiki/TCP_window_scale_option, Dec. 22, 2013, 3 pages.

Dukkipati et al, "An Argument for Increasing TCP's Initial Congestion Window", https://developers.google.com/speed/articles/tcp_initcwnd_paper.pdf, Mar. 17, 2010, 7 pages.

* cited by examiner

NETWORK DATA OPTIMIZATION

BACKGROUND

A user experience at a service area of an operator network may be poor depending on a signal at the service area. For example, a signal at a service area may be weak or the bandwidth may be at capacity resulting in a poor user experience for a user in the service area. Accordingly, to improve the user experience in the service area, the operator network processes data using optimization techniques before a base station transmits the data to the user. The same optimization techniques are applied to data flowing through all base stations connected to a same packet data network gateway (PGW) in the operator network.

DETAILED DESCRIPTION OF PREFERRED EMBODIMENTS

The following detailed description of example implementations refers to the accompanying drawings. The same reference numbers in different drawings may identify the same or similar elements.

A PGW may be connected to multiple base stations. These base stations may cover different areas and the user experience in these areas may not be the same. Applying an optimization technique to data flowing through the PGW may improve a user experience for areas covered by some of the base stations connected to the PGW, and may worsen a user experience for areas covered by other base stations connected to the same PGW. For example, the optimization technique may compress data, which may improve throughput at certain areas. However, throughput may not be a problem at other areas and there may be no need to compress data and sacrifice data quality at these areas. Accordingly, a one size fits all method of applying optimization techniques to data flowing through a PGW may not be optimal.

Implementations described herein may determine whether to apply an optimization technique to data based on the base station to which the data flows. Additionally, or alternatively, implementations described herein may determine which optimization technique to apply and/or a level of the optimization technique to apply based on a signal characteristic of a signal at the base station.

Figure 1:
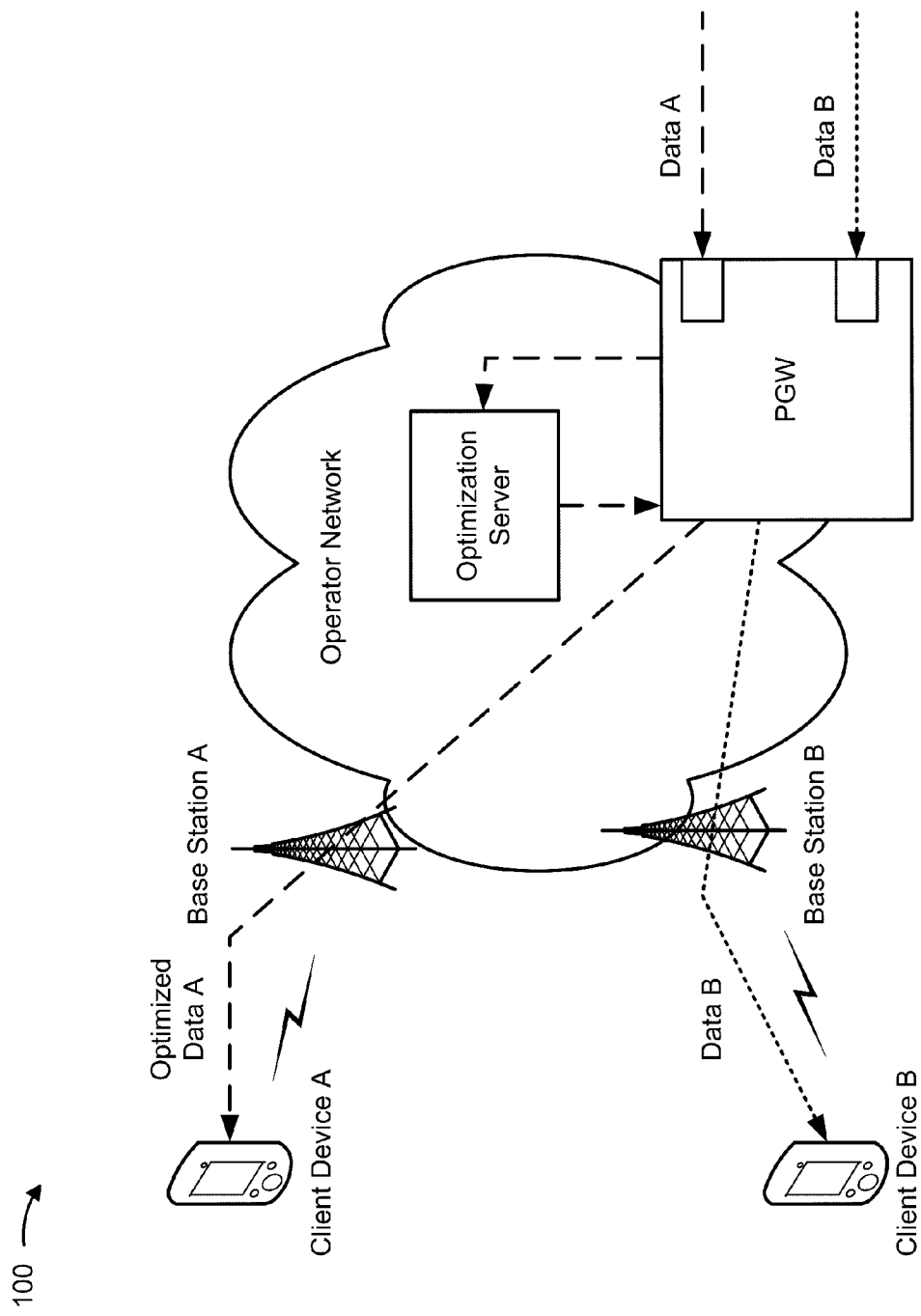
FIG. 1 is a diagram of an overview of an example implementation described herein.

FIG. 1 is a diagram of an overview of an example implementation 100 described herein. In example implementation 100, assume a client device A establishes a connection with an operator network through a base station A. Further, assume a PGW in the operator network selects an optimized access point identifier (ID) for communication between client device A and an outside network based on the connection going through base station A. The optimized access point ID may identify an access point that routes data received from the outside network through an optimization server before sending the data to client device A.

Also, assume a client device B establishes a connection with the operator network through a base station B. Further, assume the PGW in the operator network selects a non-optimized access point ID for communication between client device B and the outside network based on the connection going through base station B. The non-optimized access point may identify an access point that does not route data from the outside network though the optimization server.

As shown in FIG. 1, the outside network may send data A to the PGW for transmission to client device A using the optimized access point ID. The PGW may receive the data A and send the data A to the optimization server based on the optimized access point ID. In some implementations, base station A may determine a signal characteristic of a signal used to communicate with client device A and send information identifying the signal characteristic to the PGW. The PGW may receive the information identifying the signal characteristic. The PGW may instruct the optimization server to use a certain kind of optimization technique to process the data and/or a level of the optimization technique to use based on the signal characteristic. The optimization server may receive data A and/or the instruction and process the data A using the optimization technique. The optimization server may generate optimized data A by performing optimization processing on the data based on the instruction. The optimization server may send the optimized data A to the PGW and the PGW may receive the optimized data A. The PGW may send the optimized data A to client device A via base station A and client device A may receive the optimized data A.

As further shown in FIG. 1, the outside network may send data B to the PGW for transmission to client device B using the non-optimized access point ID. The PGW may receive the data B and send the data B to client device B via base station B. Data B may not be sent to the optimization server for processing based on the non-optimized access point ID being used for the communication between client device B and the outside network.

In this way, optimization techniques may selectively be used to process data flowing through a same PGW based on which base station the data will flow through. Furthermore, for a base station for which optimization techniques should be used, an optimization technique may be selected and/or a level of an optimization technique may be selected based on a signal characteristic at the base station.

Figure 2:
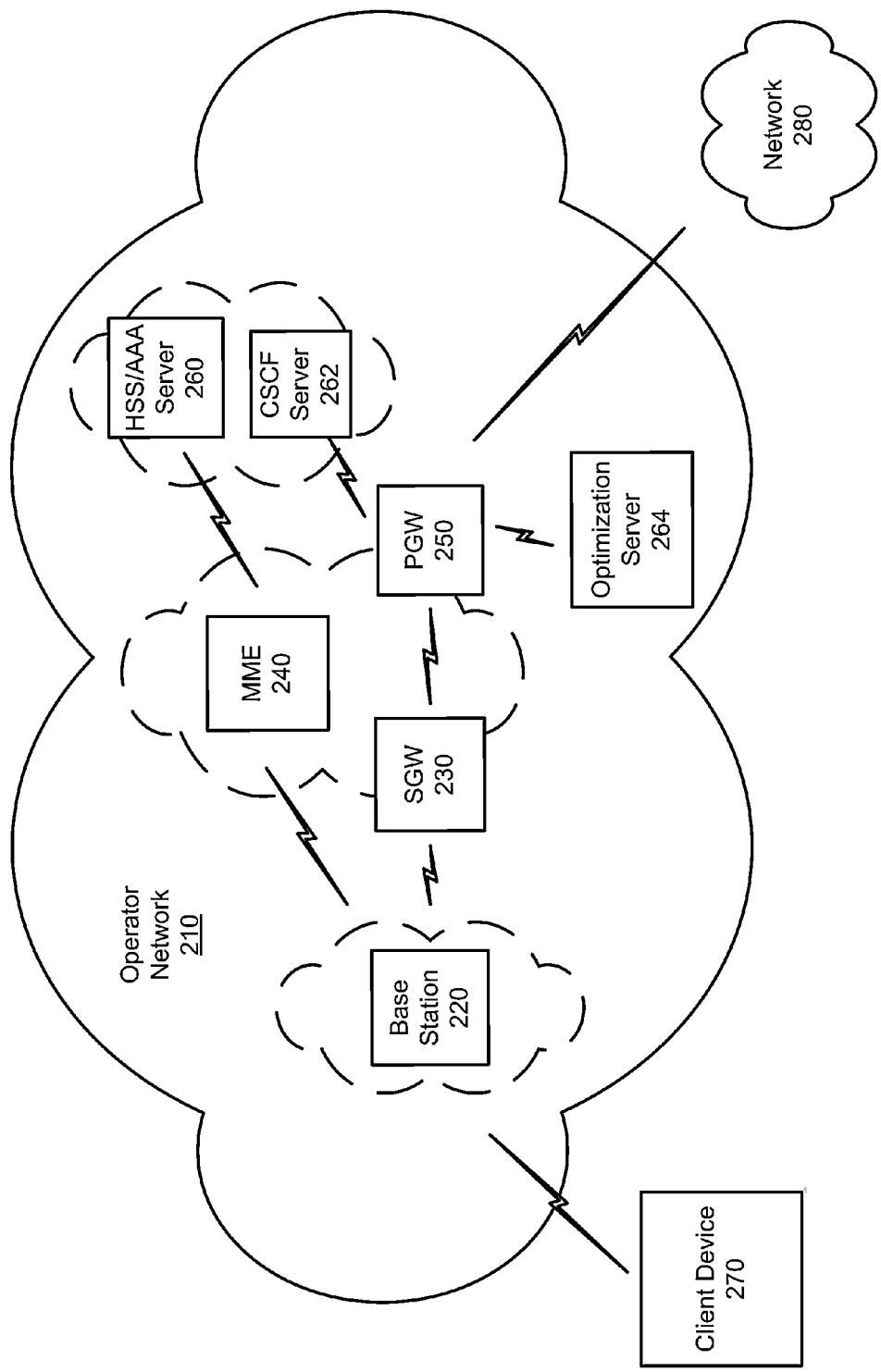
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an operator network 210. The operator network 210 may include a base station 220, a serving gateway 230 (hereinafter referred to as "SGW 230"), a mobility management entity device 240 (hereinafter referred to as "MME 240"), a packet data network (PDN) gateway 250 (hereinafter referred to as "PGW 250"), a home subscriber server (HSS)/authentication, authorization, accounting (AAA) server 260 (hereinafter referred to as "HSS/AAA server 260"), a call session control function (CSCF) server 262 (hereinafter referred to as "CSCF server 262"), and/or an optimization server 264. Environment 200 may also include a client device 270 and/or a network 280.

Operator network 210 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations, such as eNodeBs (eNBs), via which client device 270 communicates with the EPC. The EPC may include SGW 230, MME 240, and/or PGW 250 that enables client device 270 to communicate with network 280 and/or an Internet protocol (IP) multimedia subsystem (IMS) core. The IMS core may include HSS/AAA server 260 and/or CSCF server 262 and may manage certain information and services, such as authentication, session initiation, account information, and/or a user profile, associated with client device 270. The LTE network may include multiple base stations 220, and the EPC may include multiple SGWs 230, MMEs 240, and/or PGWs 250. Additionally, or alternatively, operator network 210 may include a cellular network, a public land mobile network (PLMN), a second generation (2G) network, a third generation (3G) network, a fourth generation (4G) network, a fifth generation (5G) network, and/or another network.

Base station 220 may include one or more network devices that receive, process, and/or transmit traffic, such as audio, video, text, and/or other data, destined for and/or received from client device 270. In an example implementation, base station 220 may be an eNB device and may be part of the LTE network. Base station 220 may receive traffic from and/or send traffic to network 280 via SGW 230 and PGW 250. Base station 220 may send traffic to and/or receive traffic from client device 270 via an air interface. One or more of base stations 220 may be associated with a RAN, such as the LTE network.

SGW 230 may include one or more network devices, or other types of computation or communication devices, that gather, process, search, store, and/or provide information in a manner described herein. SGW 230 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 280 via PGW 250. In one example implementation, SGW 230 may route and forward data, may act as a mobility anchor for a user plane during inter-base station handovers, and may act as an anchor for mobility between LTE and other 3GPP technologies.

MME 240 may include one or more computation or communication devices that gather, process, search, store, and/or provide information in a manner described herein. For example, MME 240 may perform operations associated with a handoff to and/or from the EPS. MME 240 may perform operations to register client device 270 with the EPS, to handoff client device 270 from the EPS to another network, to handoff client device 270 from the other network to the EPS, and/or to perform other operations. MME 240 may perform policing operations for traffic destined for and/or received from client device 270.

PGW 250 may include one or more network devices that gather, process, search, store, and/or provide information in a manner described herein. PGW 250 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 250 may, for example, provide connectivity of client device 270 to external packet data networks, such as network 280, by being a traffic exit/entry point for client device 270. PGW 250 may perform policy enforcement, packet filtering, charging support, lawful intercept, and packet screening. PGW 250 may also act as an anchor for mobility between 3GPP and non-3GPP technologies. PGW 250 may authenticate client device 270 (e.g., via interaction with HSS/AAA server 260).

HSS/AAA server 260 may include one or more server devices, or other types of computation or communication devices, that gather, process, search, store, and/or provide information in a manner described herein. For example, HSS/AAA server 260 may manage, update, and/or store, in a memory associated with HSS/AAA server 260, profile information associated with client device 270 that identifies applications and/or services that are permitted for and/or accessible by client device 270, bandwidth or data rate thresholds associated with the applications or services, information associated with a user of client device 270 (e.g., a username, a password, a personal identification number (PIN), etc.), a data plan, rate information, minutes allowed, and/or other information. Additionally, or alternatively, HSS/AAA server 260 may include a device that performs authentication, authorization, and/or accounting (AAA) operations associated with a communication session with client device 270. With regard to the authentication operation, HSS/AAA server 260 may verify a device's (e.g., client device 270) specific digital identity provided via an identifier (e.g., a password, a digital certificate, a phone number, etc.) associated with the device. With regard to the authorization function, HSS/AAA server 260 may grant or refuse privileges to a device (e.g., client device 270) for accessing specific services (e.g., IP address filtering, address assignment, route assignment, quality of service (QoS), etc.). With regard to the accounting operation, HSS/AAA server 260 may track consumption of network resources (e.g., by client device 270) and may use this information for management, planning, billing, etc.

CSCF server 262 may include one or more server devices, or other types of computation or communication devices, that gather, process, search, store, and/or provide information in a manner described herein. CSCF server 262 may process and/or route calls to and from client device 270 via the EPC. For example, CSCF server 262 may process calls, received from network 280, that are destined for client device 270. In another example, CSCF server 262 may process calls, received from client device 270, that are destined for network 280.

CSCF server 262 may also include a policy and charging rules function (PCRF) that may perform operations that enforce EPS policies associated with a communication session with client device 270. For example, the PCRF may dynamically provide real-time bandwidth allocations and/or controls (e.g., associated with a particular access point name (APN)) associated with particular applications, network accesses, and/or services provided to client device 270 during a communication session. The PCRF may also dynamically provide a real-time signal flow policy to adapt to changing conditions within the network and/or to manage traffic flow during the communication session.

Optimization server 264 may include one or more server devices, or other types of computational or communication devices, that gather, process, search, store, and/or provide information in a manner described herein. Additionally, or alternatively, optimization server 264 may include a communication interface that allows optimization server 264 to receive information from and/or transmit information to other devices in environment 200. Optimization server 264 may store instructions for Transmission Control Protocol (TCP)/Hypertext Transfer Protocol (HTTP) optimization techniques to be applied to data being sent to client device 270 via operator network 210. The TCP/HTTP optimization techniques may include a TCP opaque proxy, a TCP transparent proxy, a TCP translucent proxy, a TCP wireless aware proxy, receive window (RWIN) manipulation, TCP options manipulation, parallel HTTP request optimization, HTTP flow re-use, SPDY, maximum segment size (MSS)/maximum transmission unit (MTU) manipulation and/or optimization, MSS/MTU clamping, full back to back independent flow control, TCP multiplexing (header compression) or connection pooling, data compression, selective acknowledgments (e.g., RFC2108 and RFC2883), explicit congestion notification (ECN) (e.g., RFC3167 and RFC2481), limited and fast retransmits (e.g., RFC2582 and RFC2042), adaptive initial congestion windows (e.g., RFC3390), TCP extensions for high performance (e.g., RFC 1323), conservative selective acknowledgment-based loss recovery algorithm for (e.g., RFC 3517), delayed acknowledgments (e.g., RFC896), employing a Nagle algorithm (e.g., RFC1122), throttling a data rate, or the like.

Client device 270 may include any computation or communication device, such as a communication device that is capable of communicating with a network (e.g., network 280) and/or an operator network (e.g., operator network 210). For example, client device 270 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a computer, a laptop, a tablet computer, a server, a camera, a gaming device, a machine-to-machine (M2M) device, and/or another mobile, computation, or communication device.

Network 280 may include one or more wired and/or wireless networks. For example, network 270 may include a cellular network, a PLMN, a 2G network, a 3G network, a 4G network, a 5G network, and/or another network. Additionally, or alternatively, network 270 may include a wide area network (WAN), a metropolitan network (MAN), a telephone network (e.g., the Public Switched Telephone Network (PSTN)), an ad hoc network, an intranet, the Internet, a fiber optic-based network, and/or combination of these or other types of networks.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, optimization server 264 may be included in PGW 250. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
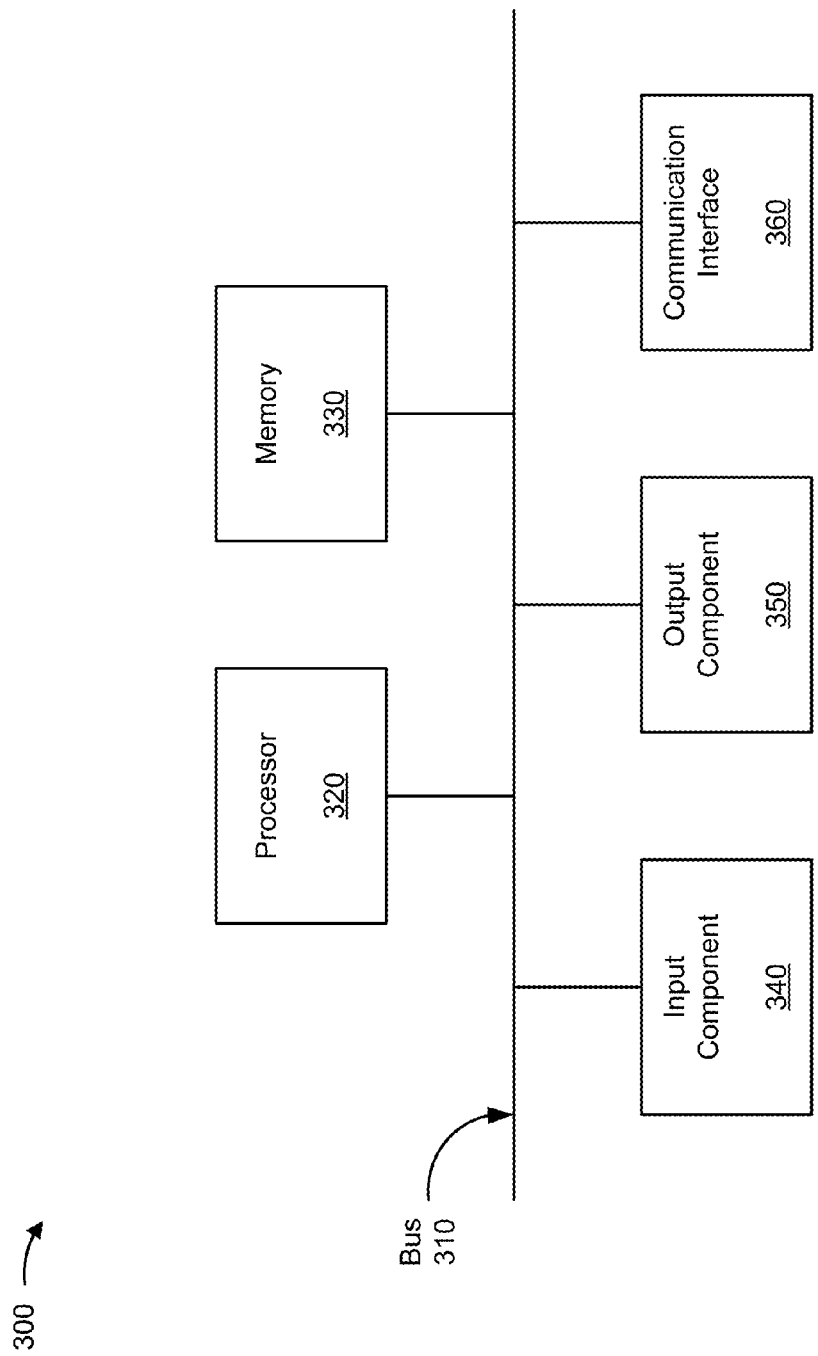
FIG. 3 is a diagram of example components of a device that corresponds to one or more devices of FIG. 2.

FIG. 3 is a diagram of example components of a device 300 that corresponds to one or more devices of FIG. 2. Device 300 may correspond to base station 220, SGW 230, MME 240, PGW 250, HSS/AAA server 260, CSCF server 262, optimization server 264, and/or client device 270. Additionally, or alternatively, base station 220, SGW 230, MME 240, PGW 250, HSS/AAA server 260, CSCF server 262, optimization server 264, and/or client device 270 may include one or more devices 300 and/or one or more components of device 300.

As illustrated in FIG. 3, device 300 may include a bus 310, a processor 320, a memory 330, an input component 340, an output component 350, and/or a communication interface 360.

Bus 310 may include a path that permits communication among the components of device 300. Processor 320 may include a processor (e.g., a central processing unit, a graphics processing unit, an accelerated processing unit), a microprocessor, and/or another type of processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). If device 300 corresponds to client device 270, input component 340 may also include a sensor for sensing information.

Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
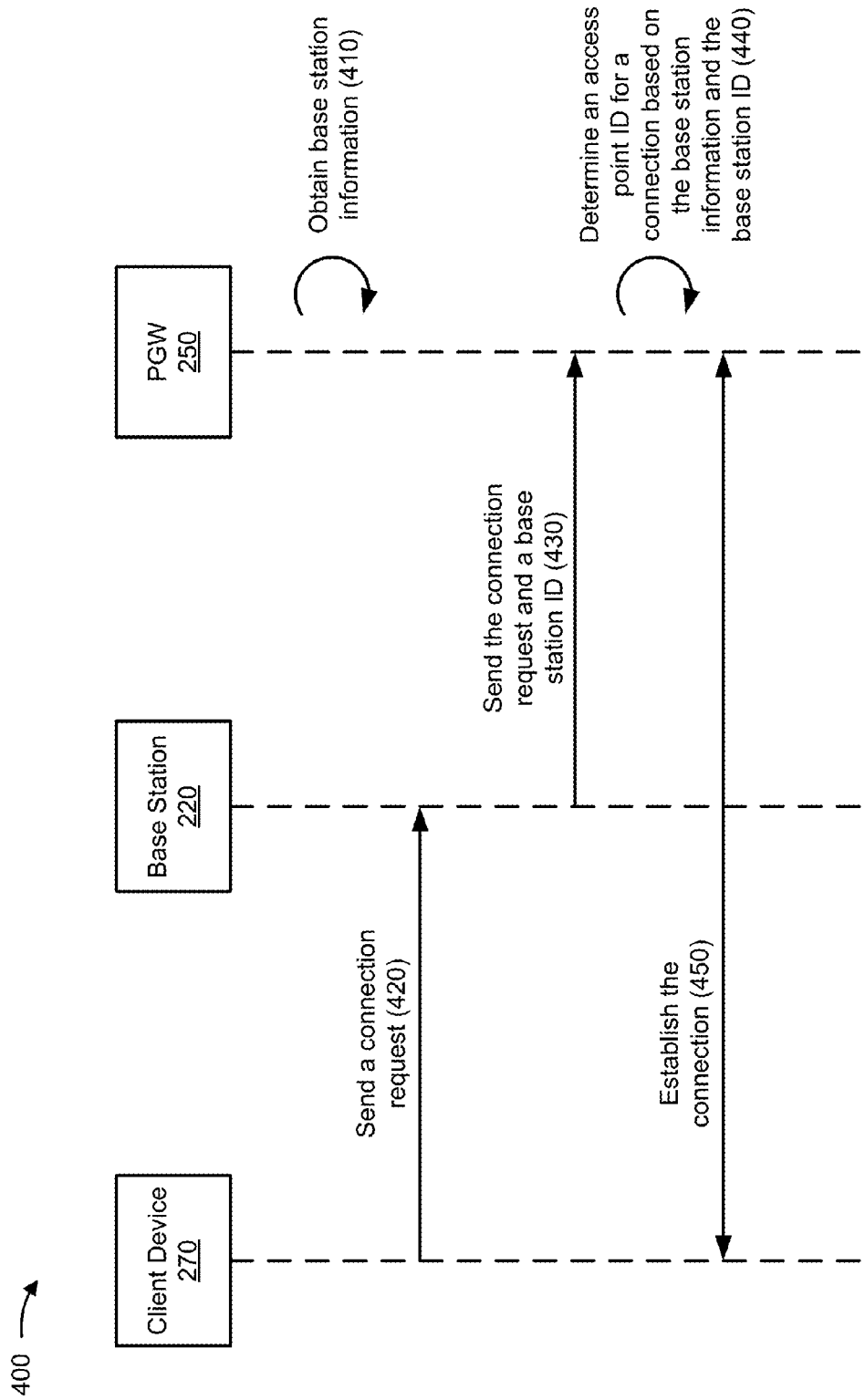
FIG. 4 is a call flow diagram of an example process for determining whether an optimization technique should be used to process data.

FIG. 4 is a call flow diagram of an example process 400 for determining whether an optimization technique should be used to process data. In some implementations, one or more process blocks of FIG. 4 may be performed by base station 220, PGW 250, and/or client device 270. Additionally, or alternatively, one or more process blocks of FIG. 4 may be performed by another device or a group of devices separate from or including base station 220, PGW 250, and/or client device 270.

As shown in FIG. 4, process 400 may include obtaining base station information (block 410). For example, PGW 250 may obtain the base station information.

The base station information may be stored in a memory of PGW 250. Additionally, or alternatively, the base station information may be stored in a memory accessible by PGW 250 (e.g., a memory included in HSS/AAA server 260). PGW 250 may obtain the base station information from the memory.

The base station information may include a base station data structure that associates a base station ID, which identifies base station 220, with information indicating whether data communicated via base station 220 requires optimization. The base station ID may be any string of characters of any length that identifies base station 220. For example, the base station ID may include a Tracking Area Code (TAC) that represents a group of base stations 220. In some implementations, the base station information may indicate an access point ID over which data communicated by base station 220 should be transmitted. The access point ID may identify an access point that may be used by PGW 250 to send and/or receive data between network 280 and client device 270. The access point ID may include an APN ID associated with an APN (e.g., a name of a gateway that PGW 250 may use to transmit data). In some implementations, the base station data information may indicate a kind of TCP/HTTP optimization technique to use to process data communicated via base station 220.

As further shown in FIG. 4, process 400 may include sending a connection request to base station 220 (block 420). For example, client device 270 may send the connection request to base station 220.

The connection request may request a connection be established between client device 270 and operator network 210. Client device 270 may send the connection request to base station 220 and base station 220 may receive the connection request.

As further shown in FIG. 4, process 400 may include sending the connection request and a base station ID to PGW 250 (block 430). For example, base station 220 may send the connection request and the base station ID to PGW 250.

Base station 220 may store a base station ID that identifies base station 220 (e.g., a TAC). Base station 220 may send the base station ID with the received connection request to PGW 250 via SGW 230. PGW 250 may receive the connection request and the base station ID.

As further shown in FIG. 4, process 400 may include determining an access point ID for a connection based on the base station information and the base station ID (block 440). For example, PGW 250 may determine the access point ID.

PGW 250 may query the base station data structure using the base station ID received from base station 220, and obtain the information associated with the base station ID indicating whether data communicated via base station 220 requires optimization. If data communicated via base station 220 requires optimization, PGW 250 may set up an optimized access point ID for an optimized access point that routes data through optimization server 264. If data communicated via base station 220 does not require optimization, PGW 250 may set up a non-optimized access point ID for a non-optimized access point that does not route data through optimization server 264.

Additionally, or alternatively, the base station data structure may indicate an access point ID that PGW 250 should use for communication via base station 220. PGW 250 may query the base station data structure using the base station ID received from base station 220, and obtain the access point ID from the base station data structure associated with the base station ID.

As further shown in FIG. 4, process 400 may include establishing a connection between client device 270 and PGW 250 (block 450). For example, PGW 250 may establish the connection.

PGW 250 may receive the connection request and establish the connection with client device 270 via SGW 230 and base station 220 based on the connection request. For example, the connection may be a communication session between PGW 250 and client device 270. PGW 250 may send information to client device 270 instructing client device 270 to use the access point ID for communication. Accordingly, data flowing over the connection may use the access point ID determined for the connection. Data flowing over the connection may be passed through optimization server 264 if the access point ID is an optimized access point ID that routes data through optimization server 264. Conversely, data flowing over the connection may not be passed through optimization server 264 if the access point ID is a non-optimized access point ID that does not route date through optimization server 264.

While a series of blocks has been described with regard to FIG. 4, the blocks and/or the order of the blocks may be modified in some implementations. Additionally, or alternatively, non-dependent blocks may be performed in parallel.

Figure 5:
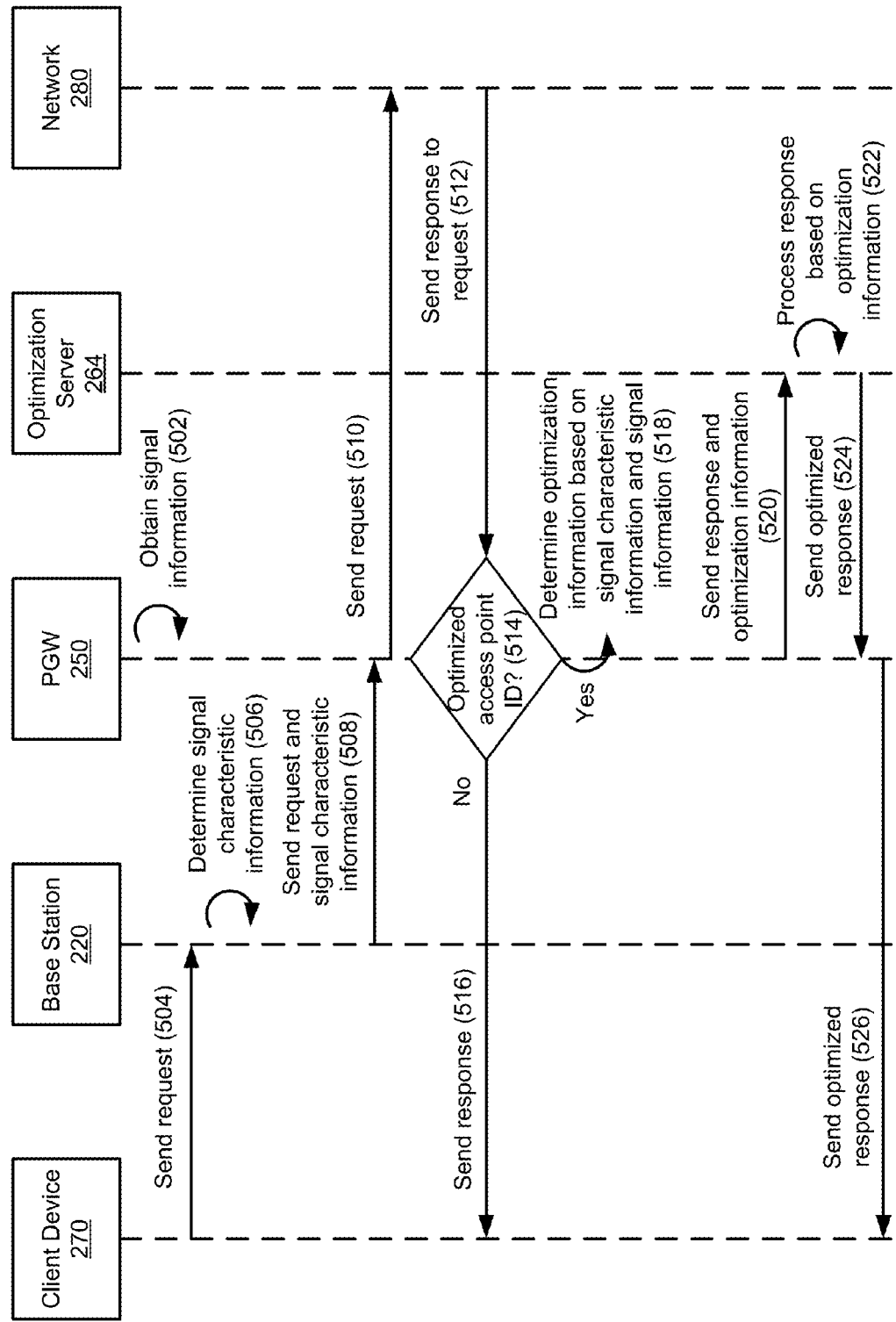
FIG. 5 is a call flow diagram of an example process for determining the optimization technique to use to process the data.

FIG. 5 is a call flow diagram of an example process 500 for determining an optimization technique to use to process data. In some implementations, one or more process blocks of FIG. 5 may be performed by base station 220, PGW 250, optimization server 264, client device 270, and/or network 280. Additionally, or alternatively, one or more process blocks of FIG. 4 may be performed by another device or a group of devices separate from or including base station 220, PGW 250, optimization server 264, client device 270, and/or network 280.

As shown in FIG. 5, process 500 may include obtaining signal information (block 502). For example, PGW 250 may obtain the signal information.

The signal information may be stored in a memory of PGW 250. Additionally, or alternatively, the signal information may be stored in a memory accessible by PGW 250. PGW 250 may obtain the signal information from the memory. The signal information may include a signal data structure that associates signal characteristic information and optimization information. The signal characteristic information may identify a signal strength, an interference level, a bandwidth, a throughput, a Modulation and Coding Scheme (MCS) value, and/or any kind of information identifying a signal characteristic. The optimization information may indicate a TCP/HTTP optimization technique (e.g., data compression) to use for an associated signal characteristic and/or indicate a level of the TCP/HTTP optimization technique to use (e.g., an amount of compression) for an associated signal characteristic.

As further shown in FIG. 5, process 500 may include sending a request to base station 220 (block 504). For example, client device 270 may send the request to base station 220.

Assume that the request is a request for data stored on a device connected to network 280. Client device 270 may send a signal including the request to base station 220 via the connection established at block 450 in FIG. 4. The request may indicate the access point ID determined at block 440 in FIG. 4. Base station 220 may receive the signal and the included request.

As further shown in FIG. 5, process 500 may include determining signal characteristic information (block 506). For example, base station 220 may determine the signal characteristic information.

Base station 220 may determine a signal characteristic of the signal received from client device 270. For example, base station 220 may determine a signal strength, an interference level, a bandwidth, a throughput, and/or a MCS value associated with the signal. Base station 220 may generate signal characteristic information identifying the signal characteristic.

As further shown in FIG. 5, process 500 may include sending the request and the signal characteristic information to PGW 250 (block 508). For example, base station 220 may send the request and the signal characteristic information to PGW 250.

In some implementations, base station 220 may include information in the request to identify the signal characteristic information. Accordingly, the request may indicate the signal characteristic.

Base station 220 may send the request and the signal characteristic information to PGW 250 via SGW 230. PGW 250 may receive the request and the signal characteristic information.

As further shown in FIG. 5, process 500 may include sending the request to network 280 (block 510). For example, PGW 250 may send the request to network 280.

PGW 250 may establish a network connection with network 280 using the access point identified by the access point ID included in the request. PGW 250 may send the request to network 280. Network 280 may receive the request and route the request to an appropriate destination (e.g., a device connected to network 280).

As further shown in FIG. 5, process 500 may include sending a response to the request to PGW 250 (block 512). For example, network 280 may send the response to PGW 250.

Network 280 may send the response to PGW 250 using the access point identified by the access point ID for the network connection. PGW 250 may receive the response via the access point identified by the access point ID.

As further shown in FIG. 5, process 500 may include determining whether the access point identified by the access point ID is an optimized access point ID or a non-optimized access point ID (block 514). For example, PGW 250 may determine whether the access point identified by the access point ID is an optimized access point ID or a non-optimized access point ID.

PGW 250 may store routing information indicating where data is routed for multiple access point IDs. PGW 250 may determine whether the access point identified by the access point ID routes data though optimization server 264 based on the routing information. The access point ID may be an optimized access point ID if data is to be routed through optimization server 264. The access point ID may be a non-optimized access point ID if data is not to be routed through optimization server 264.

As further shown in FIG. 5, process 500 may include sending the response to client device 270 if the access point ID is a non-optimized access point ID (block 516). For example, PGW 250 may send the response to client device 270.

If the access point ID is a non-optimized access point ID, PGW 250 may determine that optimization is not required and that the flow of data for the connection does not go through optimization server 264. Accordingly, PGW 250 may send the response to client device 270 via SGW 230 and base station 220. Client device 270 may receive the response and process 500 may terminate.

As further shown in FIG. 5, if the access point ID is an optimized access point ID, process 500 may include determining optimization information based on the signal characteristic information and the signal information (block 518). For example, PGW 250 may determine the optimization information for the response.

PGW 250 may query the stored signal data structure included in the signal information (e.g., obtained at block 502) using the signal characteristic information obtained from base station 220 (e.g., at block 508). PGW 250 may obtain optimization information associated with the signal characteristic information from the signal data structure. Additionally, or alternatively, PGW 250 may store a rule to apply to the signal characteristic information obtained from base station 220 to determine the optimization information. PGW 250 may apply the rule to the signal characteristic information to determine the optimization information.

As further shown in FIG. 5, process 500 may include sending the response and the optimization information to optimization server 264 (block 520). For example, PGW 250 may send the response and the optimization information to optimization server 264. Optimization server 264 may receive the response and the optimization information.

In some implementations, PGW 250 may send the signal characteristic information to optimization server 264. Optimization server 264 may receive the signal characteristic information and determine the optimization information based on the signal characteristic information.

As further shown in FIG. 5, process 500 may include processing the response based on the optimization information (block 522). For example, optimization server 264 may process the response using the TCP/HTTP optimization technique identified by the optimization information.

The optimization information received by optimization server 264 may indicate a TCP/HTTP optimization technique to use to process the response (e.g., data compression) and/or a level of the TCP/HTTP optimization technique to use (e.g., an amount of data compression). Optimization server 264 may determine which TCP/HTTP optimization technique to use to process the response and/or a level of the TCP/HTTP optimization technique to use to process the response based on the optimization information.

Additionally, or alternatively, an access point ID may be associated with a TCP/HTTP optimization technique and/or a level of the TCP/HTTP optimization technique. PGW 250 may select an access point ID associated with a TCP/HTTP optimization technique and/or a level of the TCP/HTTP optimization technique based on the signal characteristic information. PGW 250 may send the response to optimization server 264 via the access point identified by the access point ID. Optimization server 264 may receive the response and determine which TCP/HTTP optimization technique to use to process the response and a level of the TCP/HTTP optimization technique to use to process the response based on the access point ID used to send the response.

Optimization server 264 may process the response using the TCP/HTTP optimization technique to generate an optimized response. For example, optimization server 264 may perform data compression on the response. Additionally, or alternatively, optimization sever 264 may process the response using the TCP/HTTP optimization technique at the determined level to generate the optimized response. For example, optimization server 264 may compress the response by an amount indicated by the determined level of data compression.

As further shown in FIG. 5, process 500 may include sending the optimized response to PGW 250 (block 524). For example, optimization server 264 may send the optimized response to PGW 250. PGW 250 may receive the optimized response from optimization server 264.

As further shown in FIG. 5, process 500 may include sending the optimized response to client device 270 (block 526). For example, PGW 250 may send the optimized response to client device 270 via SGW 230 and base station 220. Client device 270 may receive the optimized response.

While a series of blocks has been described with regard to FIG. 5, the blocks and/or the order of the blocks may be modified in some implementations. Additionally, or alternatively, non-dependent blocks may be performed in parallel.

Figure 6:
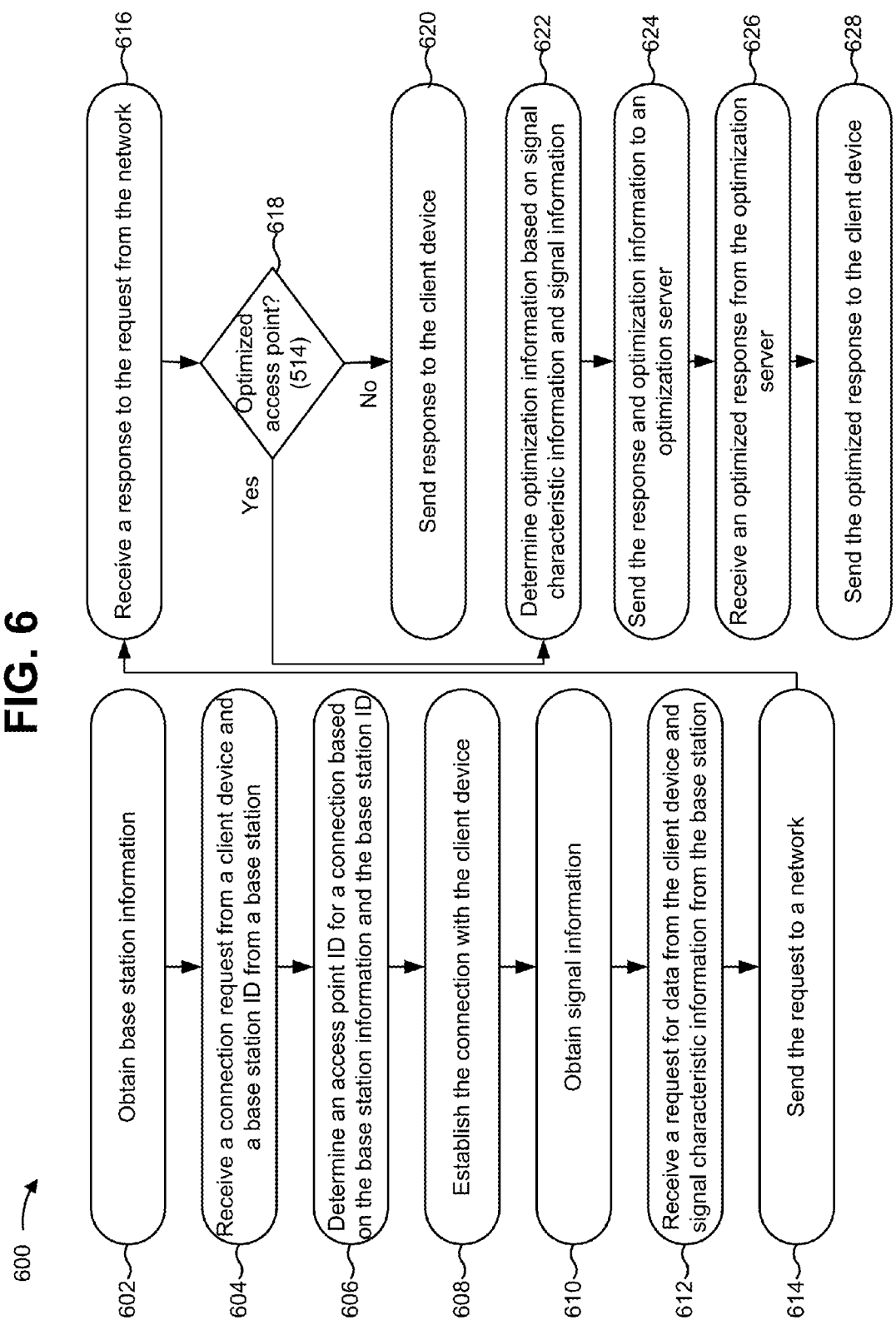
FIG. 6 is a flowchart of an example process relating to the call flow diagrams shown in FIG. 4 and FIG. 5.

FIG. 6 is a flowchart of an example process 600 relating to the call flow diagrams shown in FIG. 4 and FIG. 5. In some implementations, one or more process blocks of FIG. 6 may be performed by PGW 250. Additionally, or alternatively, one or more process blocks of FIG. 6 may be performed by another device or a group of devices separate from or including PGW 250.

As shown in FIG. 6, process 600 may include obtaining base station information (block 602). For example, PGW 250 may obtain the base station information as described with respect to block 410 in FIG. 4.

As further shown in FIG. 6, process 600 may include receiving a connection request from client device 270 and a base station ID from base station 220 (block 604). For example, PGW 250 may receive the connection request and the base station ID as described with respect to block 420 and block 430 in FIG. 4.

As further shown in FIG. 6, process 600 may include determining an access point ID for a connection based on the base station information and the base station ID (block 606). For example, PGW 250 may determine the access point ID as described with respect to block 440 in FIG. 4.

As further shown in FIG. 6, process 600 may include establishing a connection with client device 270 (block 608). For example, PGW 250 may establish the connection with client device 270 as described with respect to block 450 in FIG. 4.

As further shown in FIG. 6, process 600 may include obtaining signal information (block 610). For example, PGW 250 may obtain the signal information as described with respect to block 502 in FIG. 5.

As further shown in FIG. 6, process 600 may include receiving a request for data from client device 270 and signal characteristic information from base station 220 (block 612). For example, PGW 250 may receive the request and the signal characteristic information as described with respect to block 504, block 506, and block 508 in FIG. 5.

As further shown in FIG. 6, process 600 may include sending the request to network 280 (block 614). For example, PGW 250 may send the request to network 280 as described with respect to block 510 in FIG. 5.

As further shown in FIG. 6, process 600 may include receiving a response to the request from network 280 (block 616). For example, PGW 250 may receive the response as described with respect to block 512 in FIG. 5.

As further shown in FIG. 6, process 600 may include determining whether the access point identified by the access point ID is an optimized access point or a non-optimized access point (block 618). For example, PGW 250 may determine whether the access point identified by the access point ID is an optimized access point or a non-optimized access point as described with respect to block 514 in FIG. 5.

As further shown in FIG. 6, if the access point identified by the access point ID is a non-optimized access point (block 618—No), process 600 may include sending the response to client device 270 (block 620). For example, PGW 250 may send the response to client device 270 as described with respect to block 516 in FIG. 5

As further shown in FIG. 6, if the access point identified by the access point ID is an optimized access point (block 618—Yes), process 600 may include determining optimization information based on the signal characteristic information and the signal information (block 622). For example, PGW 250 may determine the optimization information as described with respect to block 518 in FIG. 5.

As further shown in FIG. 6, process 600 may include sending the response and optimization information to optimization server 264 (block 624). For example, PGW 250 may send the response and the optimization information to optimization server 264 as described with respect to block 520 in FIG. 5.

As further shown in FIG. 6, process 600 may include receiving an optimized response from optimization server 264 (block 626). For example, PGW 250 may receive the optimized response as described with respect to block 522 and block 524 in FIG. 5.

As further shown in FIG. 6, process 600 may include sending the optimized response to client device 270 (block 628). For example, PGW 250 may send the optimized response to client device 270 as described with respect to block 526 in FIG. 5.

While a series of blocks has been described with regard to FIG. 6, the blocks and/or the order of the blocks may be modified in some implementations. Additionally, or alternatively, non-dependent blocks may be performed in parallel.

Figure 7:
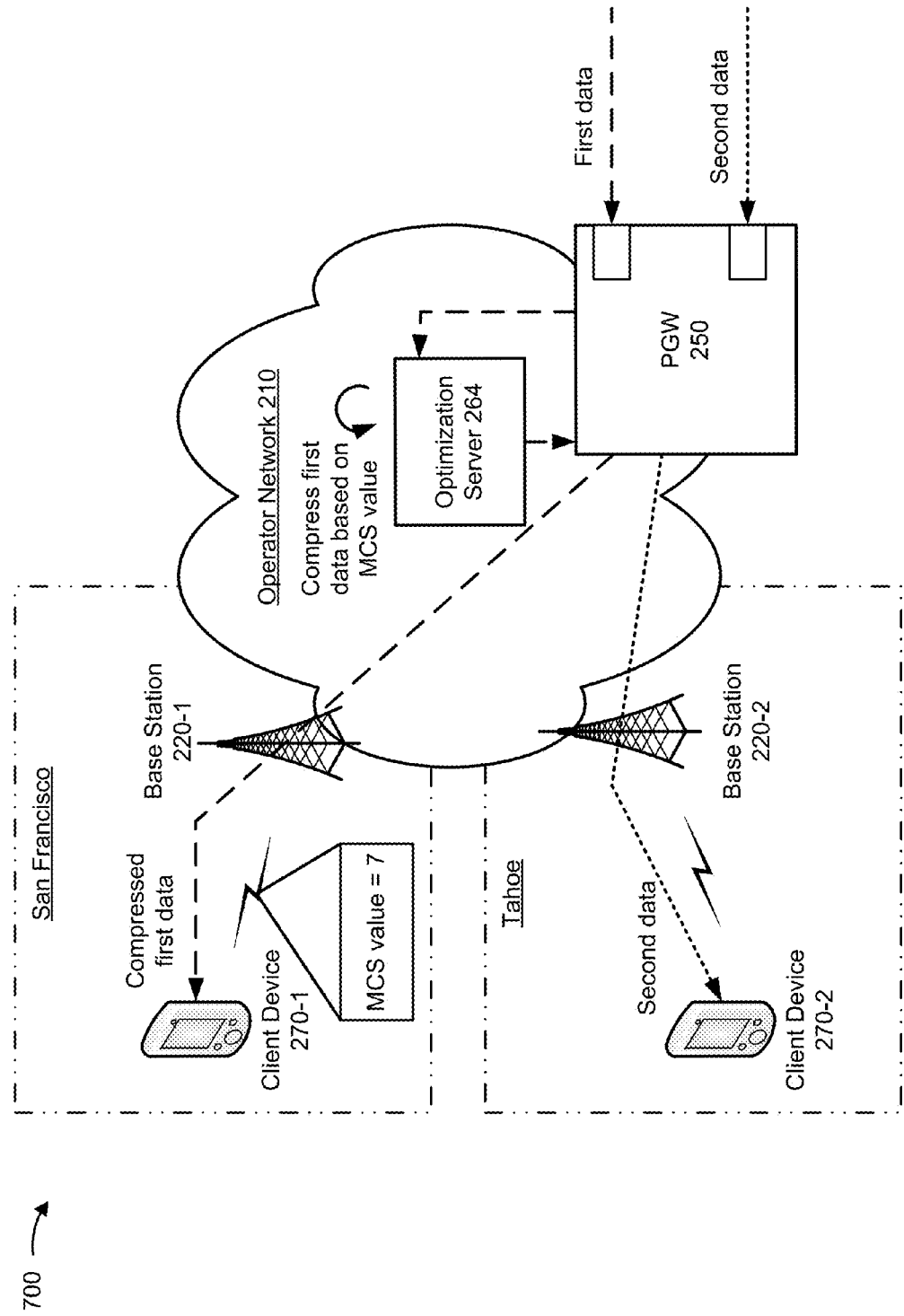
FIG. 7 is a diagram of an example implementation relating to the example processes shown in FIG. 4, FIG. 5, and FIG. 6.

FIG. 7 is a diagram of an example implementation 700 relating to process 400 shown in FIG. 4, process 500 shown in FIG. 5, and process 600 shown in FIG. 6. Assume a base station 220-1 in San Francisco and a base station 220-2 in Tahoe are both included in a same PGW coverage area for PGW 250. Further, assume PGW 250 stores base station information indicating that base station 220-1 in San Francisco is in a high congestion area that requires optimization of data, and base station 220-2 in Tahoe is in a low congestion area that does not require optimization of data.

In example implementation 700, assume client device 270-1 establishes a first connection with operator network 210 through base station 220-1. Further, assume base station 220-1 transmits a base station ID to PGW 250 and that PGW 250 receives the base station ID. Assume that PGW 250 sets up an optimized access point ID for the first connection based on the base station ID and the stored base station information.

Client device 270-1 may send a signal including a request for first data. Base station 220-1 may receive the signal including the request sent from client device 270-1. Assume that base station 220-1 determines a MCS value of the signal (e.g., a signal characteristic) to be 7. Base station 220-1 may send the request and signal characteristic information indicating the MCS value to PGW 250 via the first connection.

PGW 250 may receive the request and the signal characteristic information. PGW 250 may send the request to network 280 using the optimized access point ID set up for the first connection with client device 270-1. Network 280 may receive the request and may route the request to the appropriate destination. Network 280 may transmit the first data to PGW 250 in response to the request using the optimized access point ID. PGW 250 may receive the first data and transmit the first data to optimization server 264 based on the optimized access point ID being used.

Assume PGW 250 stores signal information indicating that a first level of data compression should be applied for MCS values of 1-10, a second level of data compression should be applied for MCS values of 11-20, and a third level of data compression should be applied for MCS values of 21-31. Accordingly, PGW 250 may determine a first level of data compression should be applied to the first data based on the MCS value of 7 for the signal included in the request. PGW 250 may transmit an instruction to optimization server 264 to process the first data using the first level of data compression.

Optimization server 264 may receive the first data and the instruction sent by PGW 250. Optimization server 264 may compress the first data using the compression at the first level based on the instruction from PGW 250. Optimization server 264 may send the compressed first data back to PGW 250.

PGW 250 may receive the compressed first data and transmit the compressed first data to client device 270-1 via SGW 230 and base station 220-1. Client device 270-1 may receive the first compressed data.

Further, in example implementation 700, assume client devices 270-2 establishes a second connection with operator network 210 through base station 220-2. Assume base station 220-2 transmits a base station ID to PGW 250 and that PGW 250 receives the base station ID. Assume that PGW 250 sets up a non-optimized access point ID for the second connection based on the base station ID and the stored base station information.

Client device 270-2 may send a signal including a request for second data. Base station 220-2 may receive the signal including the request sent from client device 270-2. Base station 220-2 may send the request to PGW 250 via the second connection.

PGW 250 may receive the request for the second data and send the request to network 280 using the non-optimized access point ID set up for the second connection with client device 270-2. Network 280 may receive the request and may route the request to the appropriate destination. Network 280 may transmit the second data to PGW 250 in response to the request using the non-optimized access point ID. PGW 250 may receive the second data and send the second data to client device 270-2 (bypassing optimization server 264) via base station 220-2 based on the non-optimized access point ID being used. Client device 270-2 may receive the second data.

In this way, the compressed first data may be sent by base station 220-1 to client device 270-1 in San Francisco's high congestion area and the uncompressed second data may be sent by base station 220-2 to client device 270-2 in Tahoe's low congestions area even though base station 220-1 and base station 220-2 are in the same PGW coverage area and served by the same PGW 250.

Implementations described herein may determine whether to apply an optimization technique to data based on the base station to which the data flows. Additionally, or alternatively, implementations described herein may determine which optimization technique to apply and/or a level of the optimization technique to apply based on a signal characteristic of a signal at the base station.

The foregoing disclosure provides illustration and description, but is not intended to be exhaustive or to limit the implementations to the precise form disclosed. Modifications and variations are possible in light of the above disclosure or may be acquired from practice of the implementations.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

As used herein, the term "component" is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be an open-ended terms. Further, the phrase "based on" is intended to mean "based, at least in part, on" unless explicitly stated otherwise.

What is claimed is:

1. A device, comprising:
   a processor; and
   a memory storing instructions that, when executed by the processor, cause the processor to:
   receive base station information indicating whether data, communicated via a base station, requires optimization processing;
   receive a base station identifier from the base station
   receive non-optimized data to be sent to a client device via the base station;
   determine an access point identifier based on receiving the base station information and receiving the base station identifier,
   the access point identifier identifying an access point;
   determine whether the access point is an optimized access point or a non-optimized access point;
   selectively cause the optimization processing to be performed on the non-optimized data based on determining whether the access point is the optimized access point or the non-optimized access point,
   the optimization processing being performed on the non-optimized data to generate optimized data based on determining that the access point is the optimized access point, or
   the optimization processing not being performed on the non-optimized data based on determining that the access point is the non-optimized access point; and
   provide the optimized data or the non-optimized data to the client device, via the base station, based on selectively causing the optimization processing to be performed.

2. The device of claim 1, where the instructions, when selectively causing the optimization processing to be performed on the non-optimized data, cause the processor to:
   provide the non-optimized data to an optimization server, for the optimization processing, based on determining that the access point is the optimized access point.

3. The device of claim 1, where the instructions, when selectively causing the optimization processing to be performed on the non-optimized data, cause the processor to:
   provide the non-optimized data to the client device, without transmitting the non-optimized data through an optimization server that performs the optimization processing, based on determining that the access point is the non-optimized access point.

4. The device of claim 1, where the base station identifier is a Tracking Area Code (TAC) that corresponds to a group of base stations.

5. The device of claim 1, where the optimization processing includes processing based on a Transmission Control Protocol (TCP)/Hypertext Transfer Protocol (HTTP) optimization technique.

6. The device of claim 5, where the base station information indicates the TCP/HTTP optimization technique for processing the non-optimized data, and
   where the optimization processing includes processing based on the TCP/HTTP optimization technique indicated in the base station information.

7. A computer-readable medium storing instructions, the instructions comprising:
   a plurality of instructions that, when executed by a processor of a device, cause the processor to:
   store base station information indicating whether data, communicated via a base station, requires optimization processing;
   receive a base station identifier from the base station
   receive non-optimized data to be sent to a client device via the base station;
   determine an access point identifier based on receiving the base station information and receiving the base station identifier,
   the access point identifier identifying an access point;
   determine whether the access point is an optimized access point or a non-optimized access point;
   selectively cause the optimization processing to be performed on the non-optimized data, to produce optimized data, based on determining that the access point is the optimized access point; and
   provide the optimized data to the client device via the base station.

8. The computer-readable medium of claim 7, where the plurality of instructions, when executed by the processor, further cause the processor to:
   receive signal characteristic information, from the base station, indicating a signal characteristic of a signal between the base station and the client device; and
   determine a kind of optimization processing based on the signal characteristic; and
   where the plurality of instructions, when selectively causing the optimization processing to be performed on the non-optimized data, cause the processor to:
   perform the optimization processing using the kind of optimization processing.

9. The computer-readable medium of claim 7, where the plurality of instructions, when executed by the processor, further cause the processor to:
   receive signal characteristic information, from the base station, indicating a signal characteristic of a signal between the base station and the client device; and
   determine a level of optimization processing based on the signal characteristic; and
   where the plurality of instructions, when selectively causing the optimization processing to be performed on the non-optimized data, cause the processor to:
   perform the optimization processing using the level of optimization processing.

10. The computer-readable medium of claim 9, where the signal characteristic information includes a Modulation and Coding Scheme (MCS) value.

11. The computer-readable medium of claim 9, where the plurality of instructions, when executed by the processor, further cause the processor to:
    store signal information associating information identifying the level of optimization processing with information identifying the signal characteristic; and
    where the plurality of instructions, when determining the level of optimization processing, cause the processor to:
    determine the level of optimization processing based on the signal characteristic and the signal information.

12. The computer-readable medium of claim 7, where the base station is a first base station;
    where the base station information is a first base station information;
    where the access point identifier is a first access point identifier;
    where the access point is a first access point;

where the base station identifier is a first base station identifier;
where the non-optimized data is first non-optimized data;
where the client device is a first client device; and
where the plurality of instructions, when executed by the processor, further cause the processor to:
obtain second base station information indicating whether data communicated via a second base station requires optimization processing;
receive a second base station identifier from the second base station
receive second non-optimized data to be sent to a second client device via the second base station;
determine a second access point identifier based on receiving the second base station information and receiving the second base station identifier,
the second access point identifier identifying a second access point;
determine whether the second access point is the optimized access point or the non-optimized access point; and
selectively provide the second non-optimized data to the second client device, via the second base station, based on determining that the second access point is the non-optimized access point.

13. The computer-readable medium of claim 12, where the first base station and the second base station are in a same packet data network gateway (PGW) coverage area.

14. A method, comprising:
receiving, by a device, base station information indicating whether data, communicated via a base station, requires optimization processing;
receiving, by the device, a base station identifier from the base station;
receiving, by the device, non-optimized data to be sent to a client device via the base station;
determining, by the device, an access point identifier based on receiving the base station information and receiving the base station identifier,
the access point identifier identifying an access point;
determining, by the device, whether the access point is an optimized access point or a non-optimized access point;
selectively causing, by the device, the optimization processing to be performed on the non-optimized data based on determining whether the access point is the optimized access point or the non-optimized access point,
the optimization processing being performed on the non-optimized data, to produce optimized data, based on determining that the access point is the optimized access point,
the optimization processing not being performed on the non-optimized data based on determining that the access point is the non-optimized access point; and
transmitting, by the device, the optimized data or the non-optimized data to the client device, via the base station, based on selectively causing the optimization processing to be performed.

15. The method of claim 14, further comprising:
selectively causing the optimization processing to be performed by sending the non-optimized data to an optimization server.

16. The method of claim 15, further comprising:
receiving the optimized data, from the optimization server, based on sending the non-optimized data to the optimization server.

17. The method of claim 14, further comprising:
receiving a request from the client device via the base station,
the request including information indicating a signal characteristic of a signal, used by the client device, to send the request; and
determining, based on the signal characteristic, at least one of:
a kind of optimization processing, or
a level of optimization processing; and
where selectively causing the optimization processing to be performed includes:
performing the optimization processing using at least one of:
the kind of optimization processing, or
the level of optimization processing.

18. The method of claim 17, further comprising:
transmitting the request to another device; and
where receiving the non-optimized data includes:
receiving a response to the request from the other device,
the response including the non-optimized data.

19. The method of claim 14, further comprising:
storing signal information associating information, identifying a kind of optimization processing, and information identifying a signal characteristic;
receiving the information identifying the signal characteristic from the base station, and
the information identifying the signal characteristic indicating the signal characteristic for a signal between the client device and the base station; and
determining the kind of optimization processing based on the signal characteristic and the signal information; and
where selectively causing the optimization processing to be performed includes:
performing the optimization processing, using the kind of optimization processing, on the non-optimized data.

20. The computer-readable medium of claim 12, where the plurality of instructions, when selectively causing the optimization processing to be performed on the first non-optimized data, cause the processor to:
provide the first non-optimized data to an optimization server, for the optimization processing, based on determining that the first access point is the optimized access point; and
where the plurality of instructions, when selectively providing the second non-optimized data to the second client device, cause the processor to:
provide the second non-optimized data to the second client device, without transmitting the second non-optimized data through the optimization server, based on determining that the second access point is the non-optimized access point.

* * * * *